United States Patent
Fahland et al.

(10) Patent No.: US 10,220,892 B1
(45) Date of Patent: Mar. 5, 2019

(54) ACTIVE HYBRID SPOILER FOR A MOTOR VEHICLE

(71) Applicant: GM Global Technology Operations LLC, Detroit, MI (US)

(72) Inventors: Jason D. Fahland, Fenton, MI (US); Joshua R. Auden, Brighton, MI (US); Timothy D. Demetrio, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2 days.

(21) Appl. No.: 15/685,682

(22) Filed: Aug. 24, 2017

(51) Int. Cl.
| | |
|---|---|
| *B60J 9/00* | (2006.01) |
| *B62D 37/02* | (2006.01) |
| *B62D 35/00* | (2006.01) |
| *G05D 3/12* | (2006.01) |
| *G01F 1/46* | (2006.01) |
| *G01P 3/42* | (2006.01) |
| *G01C 1/00* | (2006.01) |
| *B62D 15/02* | (2006.01) |

(52) U.S. Cl.
CPC ........... *B62D 37/02* (2013.01); *B62D 35/007* (2013.01); *G05D 3/125* (2013.01); *B62D 15/022* (2013.01); *G01C 1/00* (2013.01); *G01F 1/46* (2013.01); *G01P 3/42* (2013.01)

(58) Field of Classification Search
CPC ....... B60R 13/0206; B60R 9/045; B60R 9/00; B60R 9/06; B64C 39/024; H01L 2924/0002; B60N 2/2872; Y10T 24/307; B62D 35/007; G07F 17/246

USPC .................... 296/180.5, 180.1; 224/309, 321
See application file for complete search history.

(56) References Cited

U.S. PATENT DOCUMENTS

| | | | | | |
|---|---|---|---|---|---|
| 3,455,594 | A | * | 7/1969 | Mrlik ..................... | B60G 17/00 188/270 |
| 3,914,898 | A | * | 10/1975 | Ferguson ............... | A63H 17/26 446/470 |
| 4,558,898 | A | * | 12/1985 | Deaver ................ | B62D 35/007 264/251 |
| 4,810,022 | A | * | 3/1989 | Takagi ................. | B62D 35/005 180/197 |
| 4,889,382 | A | * | 12/1989 | Burst ..................... | B60K 11/08 296/180.5 |

(Continued)

*Primary Examiner* — Kiran B Patel
(74) *Attorney, Agent, or Firm* — Quinn IP Law

(57) ABSTRACT

A vehicle includes a vehicle body arranged along a longitudinal body axis in a body plane and having a first vehicle body end configured to face oncoming ambient airflow when the vehicle is in motion relative to a road surface. The vehicle also includes an active hybrid spoiler assembly mounted to the vehicle body and configured to control a movement of the ambient airflow along the longitudinal body axis. The spoiler assembly includes at least one stanchion mounted to the vehicle body, and first and second wing-shaped side-sections moveably connected to the stanchion(s). The spoiler assembly further includes a mechanism configured to selectively and individually shift each of the first wing-shaped side-section and the second wing-shaped side-section relative to the at least one stanchion to thereby adjust a magnitude of the aerodynamic downforce generated by each of the first wing-shaped side-section and the second wing-shaped side-section on the vehicle body.

20 Claims, 2 Drawing Sheets

(56) References Cited

U.S. PATENT DOCUMENTS

| | | | | |
|---|---|---|---|---|
| 5,013,081 | A * | 5/1991 | Cronce | B62D 35/007 296/180.1 |
| 5,236,242 | A * | 8/1993 | Seeman | B62D 35/001 296/180.1 |
| 5,356,195 | A * | 10/1994 | Kanda | B62D 35/007 296/146.8 |
| 5,678,884 | A * | 10/1997 | Murkett | B60K 13/02 180/68.1 |
| 6,170,904 | B1 * | 1/2001 | Schaedlich | B62D 35/007 180/903 |
| 6,338,524 | B1 * | 1/2002 | Wu | B62D 35/007 180/903 |
| D465,180 | S * | 11/2002 | Yokomaku | D12/181 |
| 7,052,074 | B2 * | 5/2006 | Dringenberg | B62D 35/007 296/180.5 |
| 7,201,432 | B2 * | 4/2007 | Roth | B62D 35/007 296/180.5 |
| 7,213,870 | B1 * | 5/2007 | Williams | B62D 35/007 296/180.3 |
| D546,258 | S * | 7/2007 | Kulla | D12/196 |
| D559,750 | S * | 1/2008 | Kulla | D12/181 |
| D607,386 | S * | 1/2010 | Kulla | D12/181 |
| 7,770,962 | B1 * | 8/2010 | Maxwell | B62D 35/007 296/180.5 |
| 8,215,703 | B2 * | 7/2012 | Goenueldinc | B62D 37/02 296/180.1 |
| 8,960,770 | B2 * | 2/2015 | De Luca | B62D 37/02 296/180.5 |
| 9,333,994 | B1 * | 5/2016 | Fahland | G05D 3/00 |
| 9,381,957 | B1 * | 7/2016 | Auden | B62D 35/007 |
| D811,300 | S * | 2/2018 | Yamashita | D12/181 |
| 2006/0043770 | A1 * | 3/2006 | Preiss | B62D 35/007 296/180.1 |
| 2006/0261637 | A1 * | 11/2006 | Garcia | B62D 35/007 296/180.1 |
| 2008/0116717 | A1 * | 5/2008 | Honeycutt | B62D 35/007 296/180.5 |
| 2008/0211261 | A1 * | 9/2008 | Wegener | B60T 1/16 296/180.5 |
| 2009/0284043 | A1 * | 11/2009 | Molnar | B62D 35/007 296/180.5 |
| 2013/0068547 | A1 * | 3/2013 | Wolf | B60K 11/04 180/68.4 |
| 2013/0226414 | A1 * | 8/2013 | De Luca | B62D 37/02 701/49 |
| 2015/0375809 | A1 * | 12/2015 | Yuasa | B62D 35/007 296/180.1 |
| 2017/0088192 | A1 * | 3/2017 | Auden | B62D 35/00 |
| 2017/0088193 | A1 * | 3/2017 | Heil | B62D 35/00 |
| 2017/0088200 | A1 * | 3/2017 | Heil | B62D 35/005 |
| 2017/0158257 | A1 * | 6/2017 | Fahland | B62D 35/005 |
| 2017/0274944 | A1 * | 9/2017 | Nakamura | B62D 37/02 |
| 2018/0215423 | A1 * | 8/2018 | Hermann | B62D 37/02 |

* cited by examiner

ACTIVE HYBRID SPOILER FOR A MOTOR VEHICLE

INTRODUCTION

The disclosure relates to an active hybrid spoiler for enhancement of aerodynamics of a motor vehicle.

Automotive aerodynamics is the study of aerodynamics of road vehicles. The main goals of the study are reducing drag and wind noise, minimizing noise emission, and preventing undesired lift forces and other causes of aerodynamic instability at high speeds. Additionally, the study of aerodynamics may also be used to achieve downforce in high-performance vehicles in order to improve vehicle traction and cornering abilities. The study is typically used to shape vehicle bodywork along with employing dedicated aerodynamic devices for achieving a desired compromise among the above characteristics for specific vehicle use.

A spoiler is an automotive aerodynamic device intended to "spoil" unfavorable air movement across a body of a vehicle in motion, usually described as turbulence or drag. Spoilers may be fitted at the front and/or at the rear of the vehicle body. Spoilers on the front of a vehicle are often called air dams. When the vehicle is in motion, in addition to directing air flow, such air dams also reduce the amount of air flowing underneath the vehicle which generally reduces aerodynamic lift and drag.

Additionally, when the vehicle is in motion, the flow of air at the rear of the vehicle becomes turbulent and a low-pressure zone is created, increasing drag and instability. Adding a spoiler at the rear of the vehicle body may help to delay flow separation from the body and a higher pressure zone created in front of the spoiler may help reduce lift on the vehicle body by creating downforce. As a result, in certain instances aerodynamic drag may be reduced and high speed stability will generally be increased due to the reduced rear lift.

SUMMARY

A vehicle includes a vehicle body arranged along a longitudinal body axis in a body plane and having a first vehicle body end configured to face oncoming ambient airflow when the vehicle is in motion relative to a road surface. The vehicle also includes an active hybrid spoiler assembly mounted to the vehicle body and configured to control a movement of the ambient airflow along the longitudinal body axis. The spoiler assembly includes at least one stanchion mounted to the vehicle body. The spoiler assembly also includes a first wing-shaped side-section moveably connected to the at least one stanchion. The spoiler assembly additionally includes a second wing-shaped side-section moveably connected to the at least one stanchion. The spoiler assembly further includes a mechanism configured to selectively and individually shift each of the first wing-shaped side-section and the second wing-shaped side-section relative to the at least one stanchion to thereby adjust a magnitude of the aerodynamic downforce generated by each of the first wing-shaped side-section and the second wing-shaped side-section on the vehicle body.

The vehicle may also include an electronic controller configured to regulate the mechanism.

The vehicle may additionally include a road wheel and a first sensor configured to detect a rotating speed of the road wheel and communicate the detected rotating speed of the road wheel to the controller.

The vehicle may also include a second sensor configured to detect a yaw rate of the vehicle body and communicate the detected yaw rate to the controller.

The vehicle may additionally include a third sensor configured to detect a velocity of ambient airflow relative to the vehicle and communicate the detected velocity of the ambient airflow to the controller.

The vehicle may further include a steering wheel and the spoiler assembly may additionally include a fourth sensor configured to detect an angle of the steering wheel.

The controller may be configured to selectively shift, via the mechanism, at least one of the first wing-shaped side-section and the second wing-shaped side-section relative to the vehicle body during vehicle cornering in response to the detected yaw rate, the detected angle of the steering wheel, and at least one of the detected rotating speed of the road wheel and velocity of the ambient airflow, to thereby vary the aerodynamic downforce on the vehicle body and control the detected yaw rate.

The mechanism may be configured to selectively and individually rotate each of the first wing-shaped side-section and the second wing-shaped side-section about a spoiler axis that is parallel to the body plane, and selectively and individually pivot the first wing-shaped side-section to vary a first wing-shaped side-section angle and the second wing-shaped side-section to vary a second wing-shaped side-section angle relative to the spoiler axis.

The at least one stanchion may include a first side stanchion, a second side stanchion, and a center stanchion arranged between the first side stanchion and the second side stanchion. In such an embodiment, the first wing-shaped side-section may be moveably connected to each of the first side stanchion and the center stanchion, and the second wing-shaped side-section may be moveably connected to each of the second side stanchion and the center stanchion.

The mechanism may be configured to selectively and individually rotate and pivot the first wing-shaped side-section relative to the first side stanchion and the center stanchion, and the second wing-shaped side-section relative to the second side stanchion and the center stanchion.

The mechanism may include at least one of a linear actuator, a rotary actuator, an electric motor, and operative connections or joints configured to facilitate simultaneous pivoting and rotation of the first wing-shaped side-section and the second wing-shaped side-section relative to the vehicle body and the respective stanchions.

The vehicle body may include a second vehicle body end opposite of the first end. In such an embodiment, the stanchion(s) connect each of the first wing-shaped side-section and the second wing-shaped side-section to the vehicle body either at the first vehicle body end or at the second vehicle body end.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
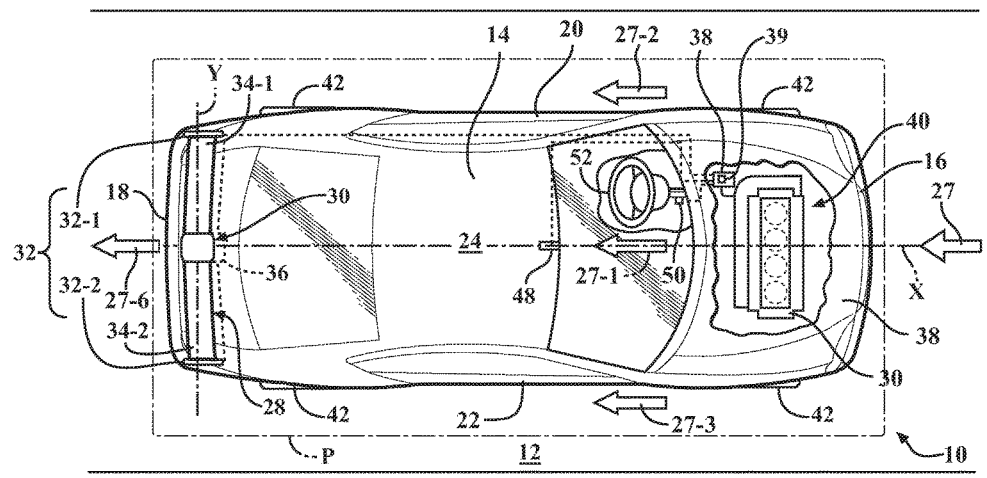
FIG. 1 is a schematic top view of a vehicle having a vehicle body arranged in a body plane along a longitudinal axis, and having a spoiler assembly according to an embodiment the disclosure.

Referring to the drawings, wherein like reference numbers refer to like components, FIG. 1 shows a schematic view of a motor vehicle 10 positioned relative to a road surface 12. The vehicle 10 includes a vehicle body 14 arranged along a longitudinal body axis X in a body plane P that is substantially parallel to the road surface 12. The vehicle body 14 defines six body sides. The six body sides include a first body end or front end 16, an opposing second body end or rear end 18, a first lateral body side or left side 20, and a second lateral body side or right side 22, a top body portion 24, which may include a vehicle roof, and an underbody portion 26.

The left side 20 and right side 22 are disposed generally parallel to each other and with respect to the virtual longitudinal axis X of the vehicle 10, and span the distance between the front end 16 and the rear end 18. The body plane P is defined to include the longitudinal axis X. A passenger compartment (not shown) of the vehicle 10 is generally bounded by the front and rear ends 16, 18 and the left and right sides of the body 14. As seen in FIG. 1, the front end 16 is configured to face an oncoming ambient airflow 27 when the vehicle 10 is in motion relative to the road surface 12. When the vehicle 10 is in motion, the oncoming ambient airflow 27 moves substantially parallel to the body plane P and along the longitudinal axis X.

As the vehicle 10 moves relative to the road surface 12, the ambient airflow 27 passes around the vehicle body 14 and splits into respective first airflow portion 27-1, second airflow portion 27-2, third airflow portion 27-3, and fourth airflow portion 27-4, that eventually rejoin in a wake area or recirculating airflow region 27-6 immediately behind the rear end 18. Specifically, as shown in FIG. 1, the first airflow portion 27-1 passes over the top body portion 24, second airflow portion 27-2 passes over the left side 20, third airflow portion 27-3 passes over the right side 22, and fourth airflow portion 27-4 (shown in FIG. 2) passes under the vehicle body 14, between the underbody portion 26 and the road surface 12. The recirculating airflow region 27-6 is generally caused at elevated vehicle speeds by the flow of surrounding air around the six body sides of the vehicle body 14.

Figure 2:
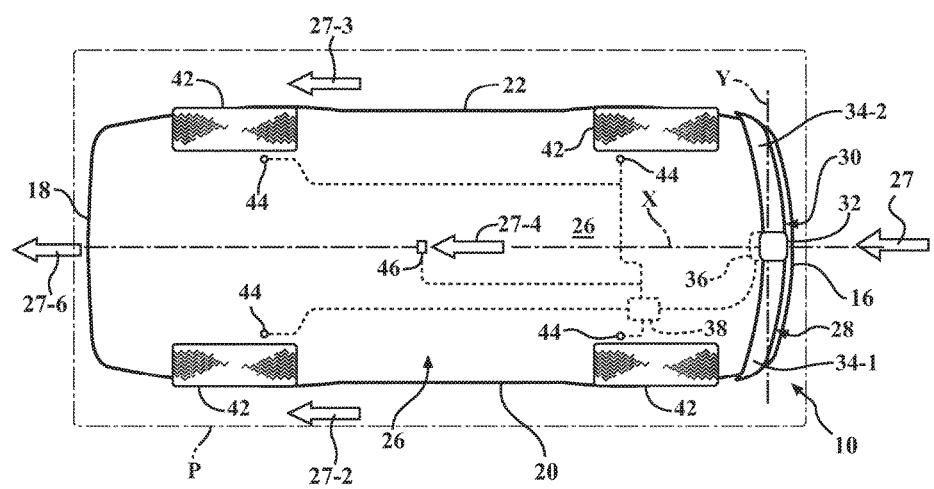
FIG. 2 is a schematic bottom view of the vehicle shown in FIG. 1 and having a spoiler assembly according to another embodiment the disclosure.
Figure 3:
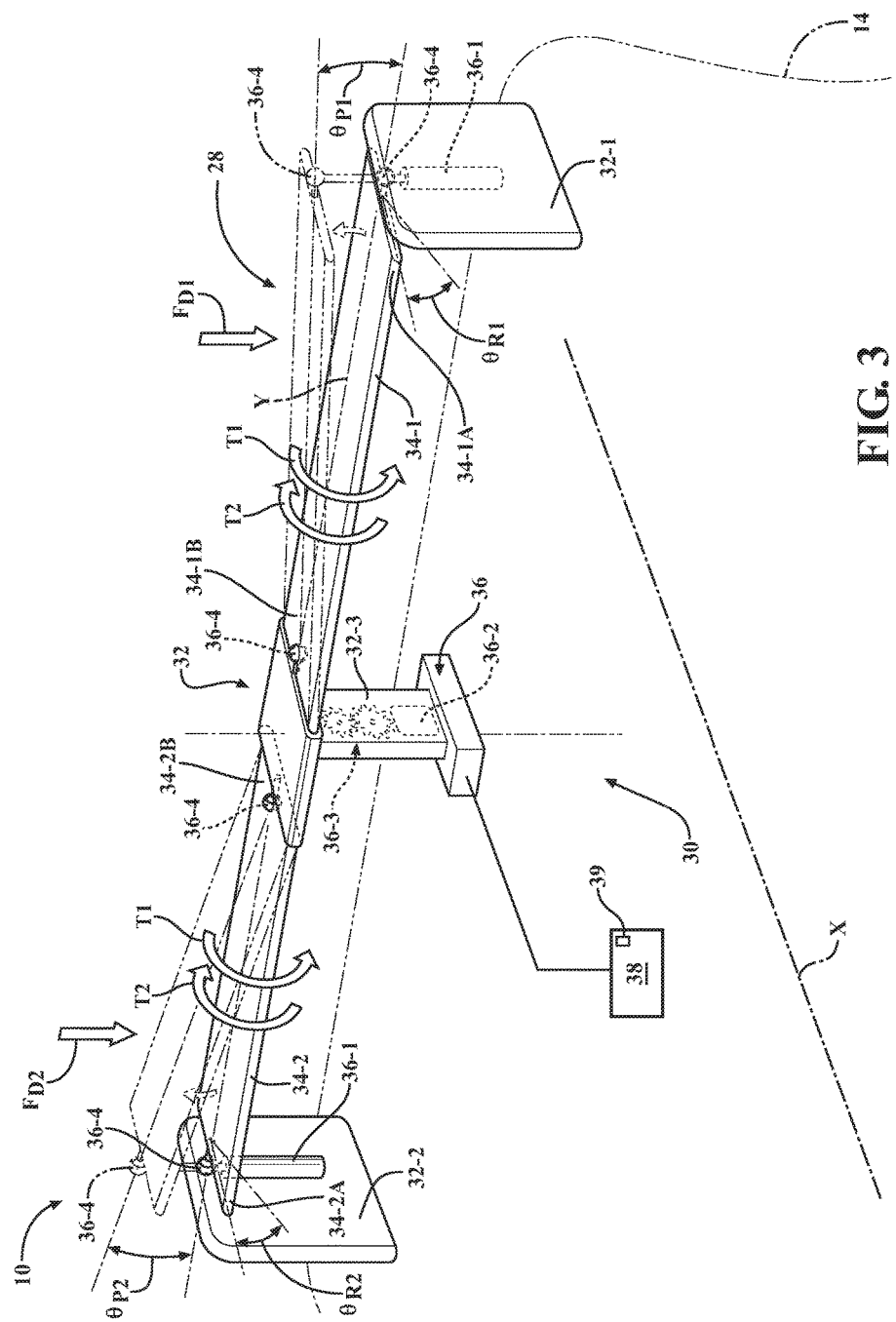
FIG. 3 is a schematic perspective view of a representative spoiler assembly for each of the embodiments shown in FIGS. 1 and 2.

As shown in FIGS. 1-3, the vehicle 10 also includes an airflow control system 28. The airflow control system 28 includes an active hybrid spoiler assembly 30 mounted to the vehicle body 14 and configured to control a movement of the ambient airflow 27 along the longitudinal body axis X. The spoiler assembly 30 includes at least one stanchion, generally indicated via numeral 32, mounted to the vehicle body 14. The spoiler assembly 30 also includes an articulating first wing-shaped side-section 34-1 arranged proximate the left side 20 and an articulating second wing-shaped side-section 34-2 arranged proximate the right side 22 of the vehicle body 14. "Wing-shaped" is herein defined as a fin having an airfoil shape, or a streamlined cross-sectional shape producing lift for flight or propulsion through a fluid. The spoiler assembly 30 is identified as an "active hybrid" assembly due to the multiple degrees of articulation available for the first and second wing-shaped side-section 34-1, 34-2. As may be seen in FIG. 3, the spoiler axis Y may be positioned initially and as a default axis, transversely to the longitudinal body axis X and parallel to the body plane P. Each of the first and second wing-shaped side-section 34-1, 34-2 may be formed from a suitably rigid but low mass material for structural stability, such as an engineered plastic, carbon fiber, or aluminum.

Each of the first wing-shaped side-section 34-1 and the second wing-shaped side-section 34-2 is moveably connected to the at least one stanchion 32. The stanchion(s) 32 may connect the first and second wing-shaped side-section 34-1, 34-2 to the vehicle body 14 at the front end 16. Similarly, the stanchion(s) 32 may connect the first and second wing-shaped side-section 34-1, 34-2 to the vehicle body 14 at the rear end 18. When mounted on the front end 16 (as shown in FIG. 2), the spoiler assembly 30 functions as an air dam that varies a downforce exerted by the ambient airflow 27 at the front of the vehicle 10. On the other hand, when the spoiler assembly 30 is mounted on the rear end 18 of the vehicle body 14 (as shown in FIG. 1), the spoiler assembly varies a downforce exerted by the ambient airflow 27 at the rear of the vehicle 10. Accordingly, to increase vehicle traction, the spoiler assembly 30 mounted on the front end 16 may be employed to increase the downforce at the front of the vehicle, while the spoiler assembly mounted on the rear end 18 may be employed to increase the downforce at the rear of the vehicle. The stanchion(s) 32 are configured to support the first and second wing-shaped side-section 34-1, 34-2 relative to the vehicle body 14 in order to apply the respective front or rear downforce to the vehicle body when the vehicle 10 is in motion.

The spoiler assembly 30 includes a virtual spoiler axis Y that is parallel to the body plane P and is perpendicular to the longitudinal body axis X. The spoiler assembly 30 further includes a mechanism 36 configured to selectively and individually shift each of the first wing-shaped side-section 34-1 and the second wing-shaped side-section 34-2 relative to stanchion(s) 32. The shifting of the first and second wing-shaped side-sections 34-1, 34-2 via the mechanism 36 is configured to adjust a magnitude of the aerodynamic downforce generated by each of the first and second wing-shaped side-sections on the vehicle body 14, specifically a downforce $F_{d1}$ on the left side 20 and a downforce $F_{d2}$ on the right side 22 of the vehicle body 14, when the vehicle 10 is in motion. The mechanism 36 may include suitable components for generating individual movement of the first wing-shaped side-section 34-1 and the second wing-shaped side-section 34-2, such as linear actuator(s) 36-1 and/or an electric motor(s) 36-2. The mechanism 36 may also include a gear drive 36-3, such as reduction gear-set(s), for coupling the linear actuator(s) or electric motor(s) to the respective first and second wing-shaped side-sections 34-1, 34-2, and configured to affect the desired movement of the subject side-sections relative to the vehicle body 14.

As also shown in FIGS. 1-3, the airflow control system 28 additionally includes an electronic controller 38 configured, i.e., constructed and programmed, to regulate the mechanism 36. The controller 38 may be configured as a central processing unit (CPU) configured to regulate operation of an internal combustion engine 40 (shown in FIG. 1), a hybrid-electric powertrain (not shown), or other alternative types of powerplants, as well as other vehicle systems, or a dedicated controller. In order to appropriately control operation of the mechanism 36, the controller 38 includes a memory, at least some of which is tangible and non-transitory. The memory may be a recordable medium that participates in providing computer-readable data or process instructions. Such a medium may take many forms, including but not limited to non-volatile media and volatile media.

Non-volatile media for the controller 38 may include, for example, optical or magnetic disks and other persistent memory. Volatile media may include, for example, dynamic random access memory (DRAM), which may constitute a main memory. Such instructions may be transmitted by one or more transmission medium, including coaxial cables, copper wire and fiber optics, including the wires that comprise a system bus coupled to a processor of a computer. Memory of the controller 38 may also include a flexible disk, hard disk, magnetic tape, magnetic medium, a CD-ROM, DVD, an optical medium, etc. The controller 38 may be configured or equipped with other required computer hardware, such as a high-speed clock, requisite Analog-to-Digital (A/D) and/or Digital-to-Analog (D/A) circuitry, input/output circuitry and devices (I/O), as well as appropriate signal conditioning and/or buffer circuitry. Algorithms required by the controller 38 or accessible thereby may be stored in the memory and automatically executed to provide the required functionality.

As shown in FIGS. 1-3, the vehicle 10 also includes road wheels 42. A plurality of first sensors 44 may be arranged on the vehicle body 14 for detecting rotating speeds of each road wheel 42 (shown in FIG. 2). Each first sensor 44 may also be configured to communicate the detected rotating speed of the respective road wheel 42 to the controller 38, while the controller may be configured to correlate the data received from the respective first sensors to road speed of the vehicle 10. The vehicle 10 may also include a second sensor 46 (shown in FIG. 2) configured to detect a yaw moment or rate on the vehicle body 14 relative to the road surface 12 and communicate the detected yaw rate to the controller 38. The vehicle may additionally include a third sensor 48 (shown in FIG. 1) configured to detect a velocity of ambient airflow 27 relative to the vehicle 10 and communicate the detected velocity of the ambient airflow to the controller 38. The third sensor 48 may be a pitot tube configured to detect a pressure of the ambient airflow 27 at a specific location relative to the vehicle body 14, and the controller 38 may correlate the measured pressure to airflow velocity.

The mechanism 36 may be configured to selectively and individually rotate each of the first wing-shaped side-section 34-1 and the second wing-shaped side-section 34-2 about the spoiler axis Y. As shown in FIG. 3, the mechanism 36 may be configured to apply a torque T1 to rotate the first or second wing-shaped side-section 34-1, 34-2 in one direction and an opposite torque T2 to rotate the subject wing-shaped side-section in the opposite direction. Such rotation of the first wing-shaped side-section 34-1 about the spoiler axis X varies a first rotation angle $\theta_{R1}$ defining an incidence of attack of the first wing-shaped side-section relative to the oncoming ambient airflow 27. Analogously, the rotation of the second wing-shaped side-section 34-2 about the spoiler axis Y varies a second rotation angle $\theta_{R2}$ defining an incidence of attack of the second wing-shaped side-section relative to the oncoming ambient airflow 27. As shown in FIGS. 1 and 3, the at least one stanchion 32 may include a first or left side stanchion 32-1, a second or right side stanchion 32-2, as well as a center stanchion 32-3 arranged between the first side stanchion and the second side stanchion.

As specifically shown in FIG. 3, each of the first wing-shaped side-section 34-1 and the second wing-shaped side-section 34-2 is defined by respective first ends 34-1A, 34-2A, and respective second ends 34-1B, 34-2B. As also shown in FIG. 3, the first wing-shaped side-section 34-1 is moveably connected to the first side stanchion 32-1 at the first end 34-1A and to the center stanchion 32-3 at the second end 34-1B. Similarly, the second wing-shaped side-section 34-2 is moveably connected to the second side stanchion 34-2 at the first end 34-2A and to the center stanchion 32-3 at the second end 34-2B. As shown, the mechanism 36 may be configured to selectively and individually pivot the first wing-shaped side-section 34-1 and the second wing-shaped side-section 34-2 relative to the body plane P. Such pivoting action of the first wing-shaped side-section 34-1 varies a first pivot angle $\theta_{P1}$ relative to the center stanchion 32-3 and to the spoiler axis Y. Similarly, the pivoting action of the second wing-shaped side-section 34-2 a second pivot angle $\theta_{P2}$ relative to the center stanchion 32-3 and to the spoiler axis Y.

To facilitate both of the above-described rotation and pivoting of the first wing-shaped side-section 34-1 and the second wing-shaped side-section 34-2, the mechanism 36 may additionally include individual operative connections 36-4 between the subject side sections and the stanchion(s) 32, e.g., the first side, second side, and center stanchions 32-1, 32-2, 32-3. Such operative connections 36-4 may, for example, include a universal joint (shown in FIG. 3) or a constant velocity joint (not shown) for each articulating interface between the first and second wing-shaped side-section 34-1, 34-2 and the respective stanchions 32-1, 32-2, 32-3, configured to enable simultaneous rotation and pivoting of the subject side-sections.

The controller 38 may be configured to vary specific angles $\theta_{R1}$, $\theta_{R2}$, $\theta_{P2}$, $\theta_{P2}$ of the at least one of the respective first wing-shaped side-section 34-1 and the second wing-shaped side-section 34-2 during cornering of the vehicle 10 in response to the yaw rate detected by the second sensor 46. Furthermore, the controller 38 may be configured to vary the angles $\theta_{R1}$, $\theta_{R2}$, $\theta_{P2}$, $\theta_{P2}$ in response to the rotating speeds of the road wheels 42 detected via the first sensor 44 and/or the velocity of the ambient airflow 27 detected via the third sensor 48. Accordingly, one or more of the angles $\theta_{R1}$, $\theta_{R2}$, $\theta_{P2}$, $\theta_{P2}$ of the respective first wing-shaped side-section 34-1 and the second wing-shaped side-section 34-2 may be controlled relative to the longitudinal body axis X, the body plane P, and to the spoiler axis Y proportionately to the yaw rate generated during cornering of the vehicle 10 by turning the subject wing-shaped side-section. The controller 38 may be programmed with a look-up table 39 establishing correspondence between the vehicle yaw rate, vehicle road speed, and/or velocity of the airflow and appropriate angles $\theta_{R1}$, $\theta_{R2}$, $\theta_{P2}$, $\theta_{P2}$ of the respective first wing-shaped side-section 34-1 and the second wing-shaped side-section 34-2 for affecting appropriate regulation of the mechanism 36. The look-up table 39 may be developed empirically during validation and testing of the vehicle 10.

As specific angles $\theta_{R1}$, $\theta_{R2}$, $\theta_{P2}$, $\theta_{P2}$ of the first wing-shaped side-section 34-1 and the second wing-shaped side-section 34-2 are varied during the cornering event, the spoiler assembly 30 positioned at the front end 16 is able to use the ambient airflow 27 more effectively in order to individually maximize the downforce $F_{D1}$ on the left side 20 and the downforce $F_{d2}$ on the right side 22 at the front end of the vehicle body 14. Similarly, the spoiler assembly 30 positioned at the rear end 18 is able to use the ambient airflow 27 more effectively during the cornering event in order to maximize the downforce $F_{D1}$ on the left side 20 and the downforce $F_{D2}$ on the right side 22 at the rear end of the vehicle body 14. Accordingly, the spoiler assembly 30 may be employed as a rudder or tiller at the front end 16 to counteract understeer, i.e., when, during cornering, the wheels 42 at the front end 16 of the vehicle 10 follow a wider path relative to an apex of the corner than the wheels 42 at the rear end 18. Similarly, the spoiler assembly 30 may be employed as a rudder at the rear end 18 to counteract oversteer, i.e., when, during cornering, the wheels 42 at the rear end 18 of the vehicle 10 follow a wider path relative to an apex of the corner than the wheels 42 at the front end 16.

To appropriately control the spoiler assembly 30 during cornering, the controller 38 may be additionally programmed to determine a slip of the vehicle 10 relative to the road surface 12. The slip of the vehicle 10 may include a measure of how much each of the road wheels 42 has slipped in a direction that is generally perpendicular to the longitudinal vehicle axis X, which identifies that the vehicle has deviated from an intended direction or path along the road surface 12. The intended direction of the vehicle 10 may be identified by the steering wheel angle, which may be detected by a fourth sensor 50 operatively connected to a steering wheel 52 (shown in FIG. 1) and communicated to the controller 38. Furthermore, the controller 38 may be programmed to compare the determined steering wheel angle and yaw rate to determine how much the vehicle has deviated from its intended direction or path.

The controller 38 may also be programmed to control the slip of the vehicle 10 relative to the road surface 12 by affecting rotation and pivoting, as needed, to control specific angles $\theta_{R1}$, $\theta_{R2}$, $\theta_{P2}$, $\theta_{P2}$ of the respective first wing-shaped side-section 34-1 and/or the second wing-shaped side-section 34-2 via the mechanism 36 in response to how much the vehicle has deviated from its intended path. The employed rotation and or pivoting of the respective first wing-shaped side-section 34-1 and/or the second wing-shaped side-section 34-2 then urges the vehicle 10 to return to the actual vehicle heading to the desired heading being commanded by an operator of the vehicle at the steering wheel 52. Additionally, two third sensors 48 may be arranged on the spoiler assembly 30, one on the first wing-shaped side-section 34-1 and the second wing-shaped side-section 34-2 (not shown). The controller 38 may then be configured to vary specific angles $\theta_{R1}$, $\theta_{R2}$, $\theta_{P2}$, $\theta_{P2}$ relative to the longitudinal body axis X, the body plane P, and to the spoiler axis Y in response to a determined differential between air velocity measurements at each third sensor 48 as the vehicle 10 enters and negotiates a turn to vary the downforce $F_{D1}$ on the left side 20 and the downforce $F_{d2}$ on the right side 22 of the vehicle body 14.

Accordingly, control of the active hybrid spoiler assembly 30 via individual rotation of the first and/or second wing-shaped side-section 34-1, 34-2 may be employed to maintain contact of the vehicle 10 with the road surface 12 at elevated speeds by countering aerodynamic lift of the vehicle body 14 in response to the velocity of ambient airflow 27 detected by the third sensor 48. Additionally, individual control of the rotation and/or pivoting of the first and/or second wing-shaped side-section 34-1, 34-2 may be employed to aid handling of the vehicle 10 in order to maintain the vehicle on its intended path by countering the yaw moment acting on the vehicle body 14 as detected by the second sensor 46. As a result, the airflow control system 28 employing the spoiler assembly 30 may operate as an airflow-based stability control system for the vehicle 10.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A vehicle comprising:
    a vehicle body arranged along a longitudinal body axis in a body plane and having a first vehicle body end configured to face oncoming ambient airflow when the vehicle is in motion relative to a road surface; and
    an active hybrid spoiler assembly mounted to the vehicle body and configured to control a movement of the ambient airflow along the longitudinal body axis, the spoiler assembly having:
        at least one stanchion mounted to the vehicle body;
        a first wing-shaped side-section moveably connected to the at least one stanchion;
        a second wing-shaped side-section moveably connected to the at least one stanchion; and
        a mechanism configured to selectively and individually shift each of the first wing-shaped side-section and the second wing-shaped side-section relative to the at least one stanchion to thereby adjust a magnitude of an aerodynamic downforce generated by each of the first wing-shaped side-section and the second wing-shaped side-section on the vehicle body.

2. The vehicle according to claim 1, further comprising an electronic controller configured to regulate the mechanism.

3. The vehicle according to claim 2, further comprising a road wheel and a first sensor configured to detect a rotating speed of the road wheel and communicate the detected rotating speed of the road wheel to the controller.

4. The vehicle according to claim 3, further comprising a second sensor configured to detect a yaw rate of the vehicle body and communicate the detected yaw rate to the controller.

5. The vehicle according to claim 4, further comprising a third sensor configured to detect a velocity of ambient airflow relative to the vehicle and communicate the detected velocity of the ambient airflow to the controller.

6. The vehicle according to claim 5, further comprising a steering wheel and a fourth sensor configured to detect an angle of the steering wheel.

7. The vehicle according to claim 6, wherein the controller is configured to selectively shift, via the mechanism, at least one of the first wing-shaped side-section and the second wing-shaped side-section relative to the vehicle body during vehicle cornering in response to the detected yaw rate, the detected angle of the steering wheel, and at least one of the detected rotating speed of the road wheel and velocity of the ambient airflow, to thereby vary the aerodynamic downforce on the vehicle body and control the detected yaw rate.

8. The vehicle according to claim 1, wherein the mechanism is configured to selectively and individually rotate each of the first wing-shaped side-section and the second wing-shaped side-section about a spoiler axis that is parallel to the body plane, and selectively and individually pivot the first wing-shaped side-section to vary a first wing-shaped side-section angle and the second wing-shaped side-section to vary a second wing-shaped side-section angle relative to the spoiler axis.

9. The vehicle according to claim 8, wherein:
the at least one stanchion includes a first side stanchion, a second side stanchion, and a center stanchion arranged between the first stanchion and the second stanchion;
the first wing-shaped side-section is moveably connected to each of the first side stanchion and the center stanchion;
the second wing-shaped side-section is moveably connected to each of the second side stanchion and the center stanchion; and
the mechanism is configured to selectively and individually rotate and pivot the first wing-shaped side-section relative to the first side stanchion and the center stanchion, and the second wing-shaped side-section relative to the second side stanchion and the center stanchion.

10. The vehicle according to claim 1, wherein the vehicle body includes a second vehicle body end opposite of the first vehicle body end, and wherein the at least one stanchion connects each of the first wing-shaped side-section and the second wing-shaped side-section to the vehicle body at one of the first vehicle body end and the second vehicle body end.

11. An airflow control system for a motor vehicle having a vehicle body arranged along a longitudinal body axis in a body plane and having a first vehicle body end configured to face oncoming ambient airflow when the vehicle is in motion relative to a road surface, the airflow control system comprising:
an active hybrid spoiler assembly mounted to the vehicle body and configured to control a movement of the ambient airflow along the longitudinal body axis, the spoiler assembly having:
at least one stanchion mounted to the vehicle body;
a first wing-shaped side-section moveably connected to the at least one stanchion;
a second wing-shaped side-section moveably connected to the at least one stanchion; and
a mechanism configured to selectively and individually shift each of the first wing-shaped side-section and the second wing-shaped side-section relative to the at least one stanchion to thereby adjust a magnitude of an aerodynamic downforce generated by each of the first wing-shaped side-section and the second wing-shaped side-section on the vehicle body; and
an electronic controller configured to regulate the mechanism.

12. The system according to claim 11, further comprising a road wheel and a first sensor configured to detect a rotating speed of the road wheel and communicate the detected rotating speed of the road wheel to the controller.

13. The system according to claim 12, further comprising a second sensor configured to detect a yaw rate of the vehicle body and communicate the detected yaw rate to the controller.

14. The system according to claim 13, further comprising a third sensor configured to detect a velocity of ambient airflow relative to the vehicle and communicate the detected velocity of the ambient airflow to the controller.

15. The system according to claim 14, wherein the vehicle includes a steering wheel, the spoiler assembly further comprising a fourth sensor configured to detect an angle of the steering wheel.

16. The system according to claim 15, wherein the controller is configured to selectively shift, via the mechanism, at least one of the first wing-shaped side-section and the second wing-shaped side-section relative to the vehicle body during vehicle cornering in response to the detected yaw rate, the detected angle of the steering wheel, and at least one of the detected rotating speed of the road wheel and velocity of the ambient airflow, to thereby vary the aerodynamic downforce on the vehicle body and control the detected yaw rate.

17. The system according to claim 11, wherein the mechanism is configured to selectively and individually rotate each of the first wing-shaped side-section and the second wing-shaped side-section about a spoiler axis that is parallel to the body plane, and selectively and individually pivot the first wing-shaped side-section to vary a first wing-shaped side-section angle and the second wing-shaped side-section to vary a second wing-shaped side-section angle relative to the spoiler axis.

18. The system according to claim 17, wherein:
at least one stanchion includes a first side stanchion, a second side stanchion, and a center stanchion arranged between the first side stanchion and the second side stanchion;
the first wing-shaped side-section is moveably connected to each of the first side stanchion and the center stanchion; and
the second wing-shaped side-section is moveably connected to each of the second side stanchion and the center stanchion.

19. The system according to claim 18, wherein the mechanism is configured to selectively and individually rotate and pivot the first wing-shaped side-section relative to the first stanchion and the center stanchion, and the second wing-shaped side-section relative to the second stanchion and the center stanchion.

20. The system according to claim 11, wherein the vehicle body includes a second vehicle body end opposite of the first end, and wherein the at least one stanchion connects each of the first wing-shaped side-section and the second wing-shaped side-section to the vehicle body at one of the first vehicle body end and the second vehicle body end.

* * * * *